United States Patent
Feher

(10) Patent No.: US 6,642,490 B2
(45) Date of Patent: Nov. 4, 2003

(54) COMPACT MILLIMETERWAVE SYSTEM FOR DE-ICING AND FOR PREVENTING THE FORMATION OF ICE ON THE OUTER SURFACES OF SHELL STRUCTURES EXPOSED TO METEROLOGICAL INFLUENCES

(75) Inventor: Lambert Feher, Linkenheim-Hochstetten (DE)

(73) Assignee: Forschungzentrum Karlsruhe GmbH, Karlsruhe (DE)

( * ) Notice: Subject to any disclaimer, the term of this patent is extended or adjusted under 35 U.S.C. 154(b) by 15 days.

This patent is subject to a terminal disclaimer.

(21) Appl. No.: 10/254,071

(22) Filed: Sep. 24, 2002

(65) Prior Publication Data

US 2003/0052230 A1 Mar. 20, 2003

Related U.S. Application Data

(63) Continuation-in-part of application No. PCT/EP01/01484, filed on Feb. 10, 2001.

(30) Foreign Application Priority Data

Apr. 3, 2000 (DE) .......................... 100 16 259

(51) Int. Cl.⁷ .......................... H05B 6/80; B64D 15/12
(52) U.S. Cl. .................. 219/679; 219/703; 219/761; 244/134 R; 244/134 D
(58) Field of Search ................... 219/678, 679, 219/703, 761; 244/134 R, 134 D

(56) References Cited

U.S. PATENT DOCUMENTS

| 4,060,212 | A | * | 11/1977 | Magenheim | ............ | 244/134 D |
| 5,061,836 | A | * | 10/1991 | Martin | ........................ | 219/679 |
| 5,615,849 | A | | 4/1997 | Salisbury | ................ | 244/134 R |
| 5,623,821 | A | | 4/1997 | Bouiller et al. | ............. | 219/679 |
| 6,489,915 | B1 | * | 12/2002 | Lines et al. | ................... | 342/26 |

FOREIGN PATENT DOCUMENTS

| DE | 197 50 198 | | 5/1999 |
| JP | 9-100650 | * | 4/1997 |
| WO | WO 98/01340 | | 1/1998 |

* cited by examiner

*Primary Examiner*—Philip H. Leung
(74) *Attorney, Agent, or Firm*—Klaus J. Bach

(57) ABSTRACT

In a millimeter wave de-icing system for the front areas of exposed shell structures, at least one independently operable millimeter wave generator is disposed in each shell structure closely adjacent the surfaces of the shell structure to be de-iced or kept free of ice and uncoupling structures are flanged to the microwave generators and have uncoupling openings disposed along the areas of the shell structure to be heated so as to provide a millimeter wave front directed toward this area. The area subjected to the wavefront includes walls of a dielectric composite material with a metallic skin whereby the millimeter wave front penetrates the wall and at least partially is converted into heat within the wall of composite material thereby providing for rapid and effective heat supply to the wall areas of the shell structure to be kept free of ice.

14 Claims, 3 Drawing Sheets

COMPACT MILLIMETERWAVE SYSTEM FOR DE-ICING AND FOR PREVENTING THE FORMATION OF ICE ON THE OUTER SURFACES OF SHELL STRUCTURES EXPOSED TO METEROLOGICAL INFLUENCES

This is a Continuation-In-Part application of international application PCT/EP01/01484 filed Feb. 10, 2001, and claiming the priority of German application 100 16 259.2 filed Apr. 3, 2000.

BACKGROUND OF THE INVENTION

The invention relates to a millimeter wave system for the de-icing of front areas of hollow structures structure which are exposed to air flows and, as a result, exposed to meteorological influences and which are therefore subject to icing.

The formation of ice on such structures detrimentally affects the air flow around the structures which results, particularly in aeronautics, to problematic aerodynamic behavior.

Many efforts have been made to keep the front edges of such structures, which are at the greatest risk of icing, free of ice. The exposed surfaces of the front areas of such surfaces are for example sprayed or flushed with liquids which prevent the formation of ice, hot air is conducted across the inner surface areas or the areas are heated electrically by resistance heating systems. De-icing by liquids is limited by the liquid reservoir required and, furthermore, is considered to be unreliable.

It is necessary to suppress the conditions under which ice can form on the respective surfaces. This is possible with liquids only for a limited time, particularly with the use of de-icing liquids on the ground before the start. The anti-icing film is torn off already during the starting phase and provides during the passage of an airplane through cloud formations in which the surfaces are subject to icing, only a relatively small time safety window. Rain washes such an anti-icing film off already on the ground relatively soon.

In aeronautics, it is common practice to blow hot air taken from the engines at the inner surfaces of the wings or, respectively, the aerodynamically important slats, that is the exposed front surfaces, particularly the wing tips. The heat transfer to the slats depends on the thermodynamic flow conditions and the meteorological circumstances and also on the travel height, the outside temperature, the travel speed, the droplet size, the lateral cloud formation, the water content of the air etc. Taking these parameters into consideration, the efficiency of a hot air anti-icing system is estimated to be about 30–40%.

Such a system results in a high power consumption and also in high losses in the supply ducts to the endangered areas of the airplane. In aeronautics, particularly in connection with modern engine technology, there are furthermore limits to the removal of sufficient amounts of hot air from the bypass flow of the engines so that it is not always possible to withdraw a sufficient amount of hot air.

In another technique, metallic nets or heating mats are disposed in the wall or on the inside wall of such structures which nets or mats can be electrically heated so that, by resistance heating, the respective surface areas can be heated or kept warm as desired. Because of the high power requirements, the electric supply lines from the onboard generator to the connecting points of the nets or heating mats, have to have a large cross-section. A homogeneous heating, that is avoiding excessive local heating, particularly in the area of the contact bars is always problematic when electric power is to be supplied to an extended area and must be carefully observed. In addition, the heat transfer to the problem areas is generally difficult.

DE 197 45 621 C1 discloses a de-icing procedure wherein a thin layer with hydrophobic properties of diamond-like carbon/amorphous hydrocarbon is deposited on the surfaces to be de-iced and, upon the formation of ice, the surface areas are irradiated by an outer infrared radiation source or are heated by a heating mat which is in contact with the surface areas and are excited and heated thereby.

DE 197 50 198 C2 discloses a technique for de-icing airplanes by microwaves wherein the microwaves are fed to the areas to be de-iced from a remote source disposed in the airplane fuselage. Fluid dynamically important areas of an airplane, which are sensitive to icing, consist of compound materials whose dielectric areas are permeable for microwaves above 20 GHz. For conducting the microwaves, suitable hollow conductors comparable to present hot air pipes, extend in the airplane fuselage within the wings from the microwave generator up to those areas where the microwaves are then uncoupled and keep these areas free of ice by heating the dielectric areas. Ice already formed is rapidly removed by heating of the interface area of the ice and the surface on which the ice has formed.

In lightweight body construction, increasingly hollow body or shell structures including pre-formed, CFK and GFK composite components are used. Although such composite materials are very form-stable and rigid and have a high mechanical strength in comparison with metal, they have, in comparison with metal, a relatively low an-isotropic thermal conductivity. As a result, heat can build up and the structure may overheat whereby local delaminations may occur when they are exposed to hot air. Concerning the flight safety the capability of supplying a sufficient power density to the surface area adjacent the air flow, which surface area is potentially coated with ice, is highly limited.

It is the object of the present invention to provide a compact de-centralized de-icing system for hollow or shell body structures which are exposed to atmospheric air flow and which are therefore subject to the formation of ice thereon.

SUMMARY OF THE INVENTION

In a millimeter wave de-icing system for the front areas of exposed shell structures, at least one independently operable millimeter wave generator is disposed in each shell structure closely adjacent the surfaces of the shell structure to be de-iced or kept free of ice and uncoupling structures are flanged to the microwave generators with uncoupling openings disposed along the areas of the shell structure to be heated so as to provide a millimeter wave front directed toward this area. The area subjected to the wave front includes walls of a dielectric composite material with a metallic skin whereby the millimeter wave front penetrates the wall and at least partially is converted into heat within the wall of composite material thereby providing for rapid and effective heat supply to the wall areas of the shell structure to be kept free of ice.

To this end, a millimeter wave source whose power output is controllable by way of pulse width control is disposed in the interior of the hollow or shell body structure and an uncoupling arrangement is flanged to the exit of the microwave source directly behind, or as close as possible behind, the front area which, on the outside, may be subject to ice formation thereon or which his to be kept free of ice. The mechanically stable hollow or shell body structures consist of CFK materials or of GFK materials or of pre-preg compound materials or a composition thereof. The outer surface of the structure consists of a metal film or a metal skin; at least the aerodynamically exposed outer surface is covered by such a film or skin which is connected along the whole edge thereof with adjacent metallic structures/ surfaces, so that these hollow or shell body structures are millimeter wave or high-frequency tight and do not permit electromagnetic radiation to be radiated out into the ambient area.

By way of the uncoupling structure, the millimeter wave radiation is directed onto the front whereby the irradiated compound material volume is heated. Within this material, after startup, a temperature gradient is established which becomes smaller toward the outer skin. The millimeter wave radiates controllably up to such a power level that, on one hand, at each location of the irradiated compound material volume a temperature-based safety distance of between 35 and 75° C. from the delaminating temperature of $T_{DL} \approx 130°$ C. of the compound material can be maintained and, on the other hand, there is, at the interface with the metal skin, a thermal surface area power density of up to 46 kW/m$^2$, whereby ice formed on the surface of the structure can be melted so that it is released from the surface and fully ripped off by the air flow.

The uncoupling structure of the uncoupling arrangement is a hollow conductor which is flanged to the microwave source or sources and which has uncoupling openings for forming the necessary microwave front. They have different sizes and different distances from one another so as to provide for a uniform uncoupling of power along the hollow conductor. The radiation characteristic is such that the phase fronts present along the wing contour are as much as possible uniform and their amplitudes provide the de-icing surface power as locally required. For example, the wing tip may require substantially higher area power densities (up to 60 k/m$^2$) than the rearward areas whose requirements may be lower by the factor 10.

For the protection of the microwave source, the microwave source may be closed in its transient and blocking attenuation by way of circulators.

Depending on the desired maximum millimeter wave power output, the millimeter wave sources are either same-type klystrons or magnetrons or Extended Interaction Oscillator (EIO's).

The millimeter wave power exits with little attenuation at the uncoupling structure and selectively heats the surrounding shell structure, which acts as a low-grade dissipative resonator. Therefore, the hollow, that is, wave conductor with uncoupling structure is made of an electrically well conducting metal or, if weight savings require it, of compound material which is surrounded by a millimeter wave-tight metal net. The metal net may also be at the inside of the wave conductor.

Such a millimeter wave-based de-icing system may be disposed in arrangements or structures of a ship, or a train or a motor vehicle or other hollow structures which have to be kept free of ice and which may encounter all kinds of meteorological conditions.

The importance of such a de-icing system in aeronautics with regard to safety is obvious. Airplanes and helicopters have to have an aerodynamically suitable shape, particularly for structures needed for providing lift and control such as the wings, the rudder, the elevators and the edges surrounding the air inlets of the engines.

In larger airplanes, which, in the lift-relevant area of the front ends of the wings, have so-called slats, a reliably operating de-icing system is absolutely necessary for flight safety.

Another important field of application is the energy generation by wind power plants, which have very large rotor blades and which are constantly exposed to ground weather conditions. In order to prevent icing of the rotor blades, a millimeter wave source is disposed in the hub of the bladed rotor. From there, a hollow conductor with uncoupling structures extends into each blade and to front areas, which may be subjected to icing.

The millimeter wave components are arranged directly in the area of action. Only power supply lines and control lines have to be brought to the millimeter wave source. There is no need for long hollow guide structures or wave guides.

With the millimeter wave de-icing system, flight safety is improved because of the fast operation of the de- or anti-icing system. During so-called routine anti-icing operation, the power requirements are relatively low. Furthermore, certain icing conditions can be controlled which cannot be handled with conventional systems.

If compound materials are used for the slats, a substantial weight reduction of more than 30% compared to today's metal construction can be achieved. Besides the safety, which has first priority, a more economical use of the airplane because of weight reductions and savings in fuel is possible. In addition, on the ground, the use of de-icing liquids, which are not absolutely safe and detrimentally affect the environment, can be reduced or actually eliminated.

With millimeter wave technology, the temperature of the laminated structures can be kept significantly lower than with conventional de-icing systems blowing hot air at the structures to be de-iced. This permits higher power applications per surface area for certain de-icing situations at the outer skin. In any case, an operation is possible in which the compound material and the structure are thermally not stressed. Even clear ice attachment situations, which cannot be handled by the systems existing today, can be controlled without the danger of overheating and a resulting delaminating of the compound material.

For the de-icing of the slats, metal guide tubes in the wings and Piccolo tube systems as they are used today for the distribution of the hot air to the surface areas to be heated are eliminated. This results in additional weight savings. Furthermore, the slats can be built as independent modules, which can be easily exchanged during servicing at the airport. This is a substantial advantage since it permits time saving repairs.

Also, if one of the systems fails, it affects only a single slat since all the systems are independently operable. Failure of one system therefore does not cause substantially deterioration of the airplane performance since the individual other slot de-icing systems are not affected by the failure of the one system and continue to operate independently (redundancy).

With the conventional system, upon failure of part of the system, warm air must be withdrawn from the system supplying the other wing which substantially reduces the effectiveness of the overall system.

It is pointed out that all of the electrical power input is converted 100% into de-icing energy, which is transmitted to the metallic outer skin of the slats.

Along the slat contour, very different area densities are required; the highest requirements are at the front edges of the wings or slats. In order to prevent so-called run back icing, that is, the re-attachment of ice sliding back from the front areas of the slats, also the rear areas of the slats must be heated. In accordance with the necessary distribution along the slat contour, an optimized hollow microwave conductor uncoupling structure with corresponding radiation distribution characteristics for appropriate area coverage is provided (optimal power adaptation to the slat geometry, see FIG. 4).

The system is closed with respect to millimeter wave and electromagnetically sealed. The CFK/composite material is surrounded by a protective metallic skin, which primarily serves as lightning protection. It also prevents the escape of microwaves from the slat system. The closed structure of the slats—hot air requires discharge channels—has also aerodynamically the advantage that essentially laminar flow conditions can be established at the interface area and disturbing turbulence formation can be prevented.

The millimeter wave de-icing system can be operated by pulse width control so that icing can be avoided in a prophylactic manner from conditions with small heating requirements up to clear ice removal with the highest heating power requirements.

The millimeter wave technical de-icing system operates without any losses; the power taken from the net and supplied to the uncoupling structure is completely converted to de-icing or anti-icing energy. The performance of such a system is even more apparent as, with icing already present, the ice can be released from the exposed surfaces within a short time by melting of the interface area.

The millimeter wave de-icing system which consists of at least one of the units presented below, will be described in greater detail on the basis of the accompanying drawings:

DESCRIPTION OF PREFERRED EMBODIMENTS

The millimeter wave de-icing has many applications. Besides the uses on land and on the water, its importance for aeronautics is most impressive. It is therefore explained on the basis of the an exemplary installation in the slats of an airplane wing.

Figure 1:
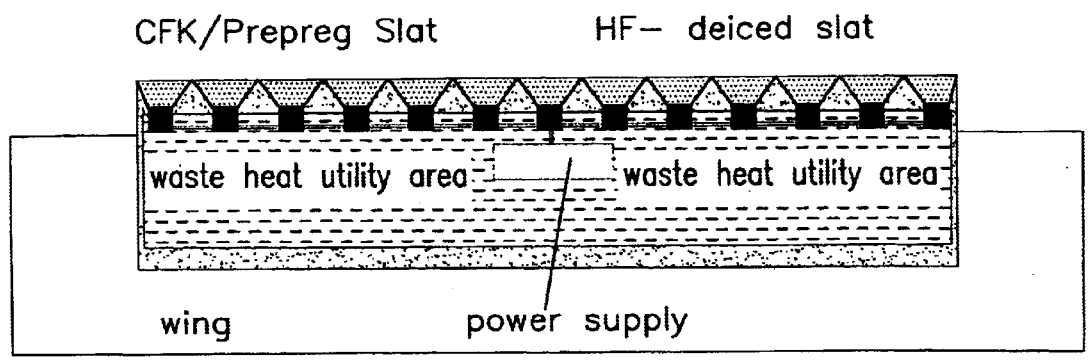
FIG. 1 shows schematically the de-icing arrangement according to the invention.
Figure 2:
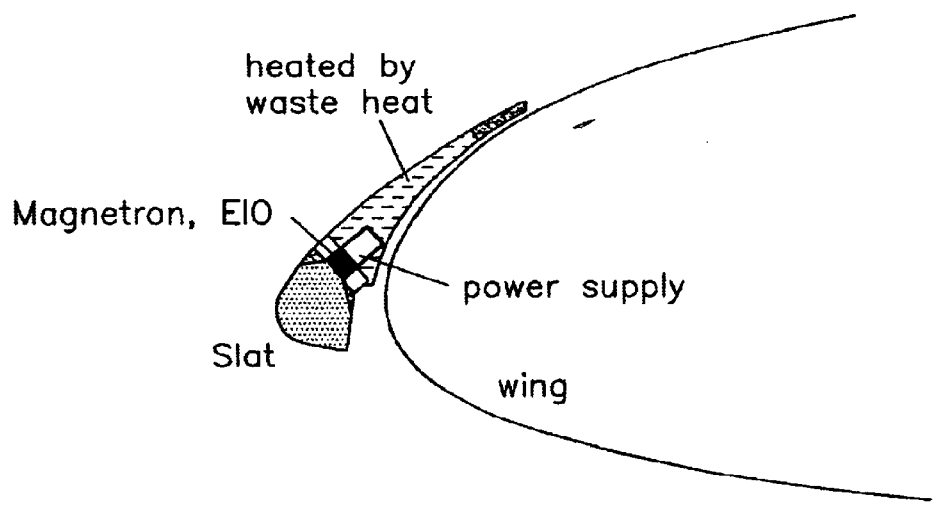
FIG. 2 shows in a cross-sectional view a slat and a front area of an airplane wing.
Figure 4:
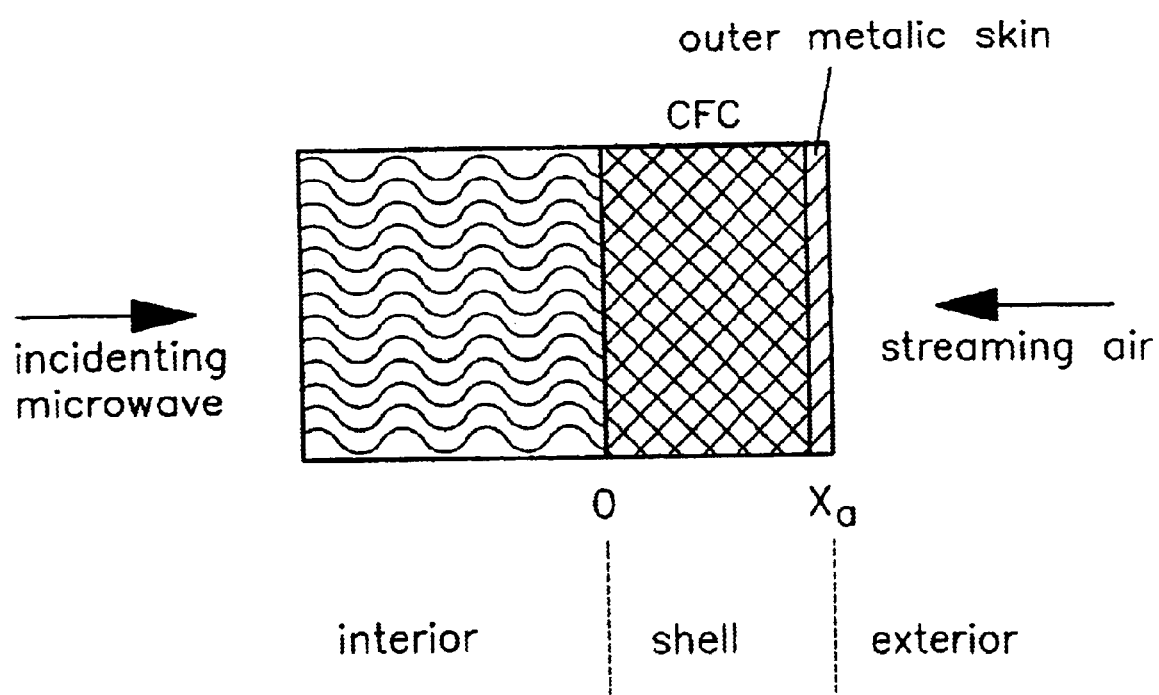
FIG. 4 shows a section of a hollow structure.

FIG. 1 shows a longitudinal cross-section of one of the slats indicated in FIG. 4 by the gray structure along the tip of an airplane wing. In the interior of such a slat, the tubular uncoupling structure/hollow conductor for the microwave is arranged so as to extend parallel to the front edge of the slat (prepping slat) which consists of CFK material. The resulting wave front is generated by the individual waves, which have been uncoupled from the hollow conductor by way of the uncoupling openings and are superimposed. Here, the hollow conductor and the uncoupling structure are the same and mounted directly to the millimeter wave source which comprises a magnetron. The structure is shown in a cross-sectional view in FIG. 2. The de-icing system is disposed in a chamber of the slat, see top view, FIG. 1.

Figure 3:
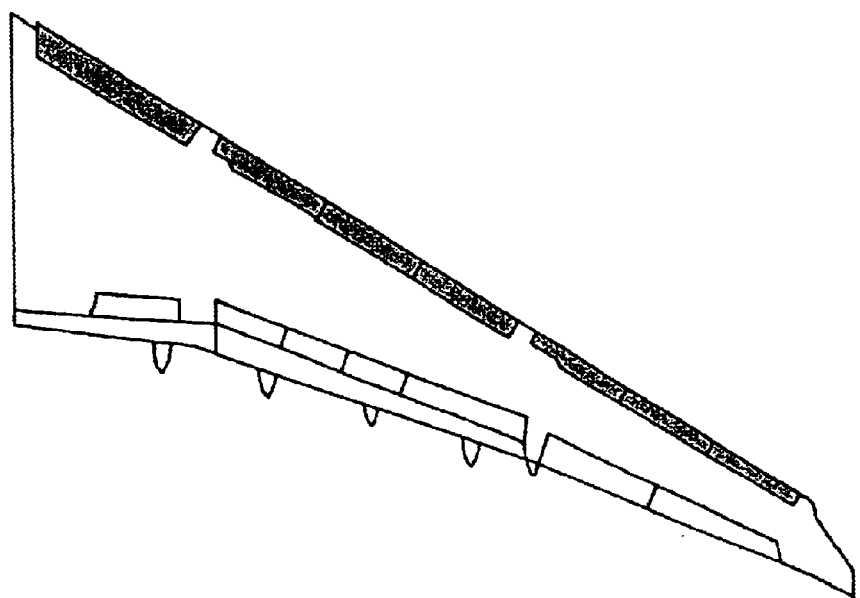
FIG. 3 shows the situation at the front end of a slat of a wing.

A slat, see FIG. 3, forms a closed interior space, which may be subdivided into separate chambers. They may be sealed with regard to millimeter waves in a simple manner, which is important for an airplane system since it should have no influence on the airplane electronic system. In the front area of the slat, the heat input should be high; it decreases in the flow direction, but is present in the required form. Together with the heat generation in the CFK-material itself and by the operation of the microwave source, the whole slat is maintained at a temperature at which no ice can be formed at the outer surface, not even in the presence of extremely super-cooled water droplets.

Figure 5:
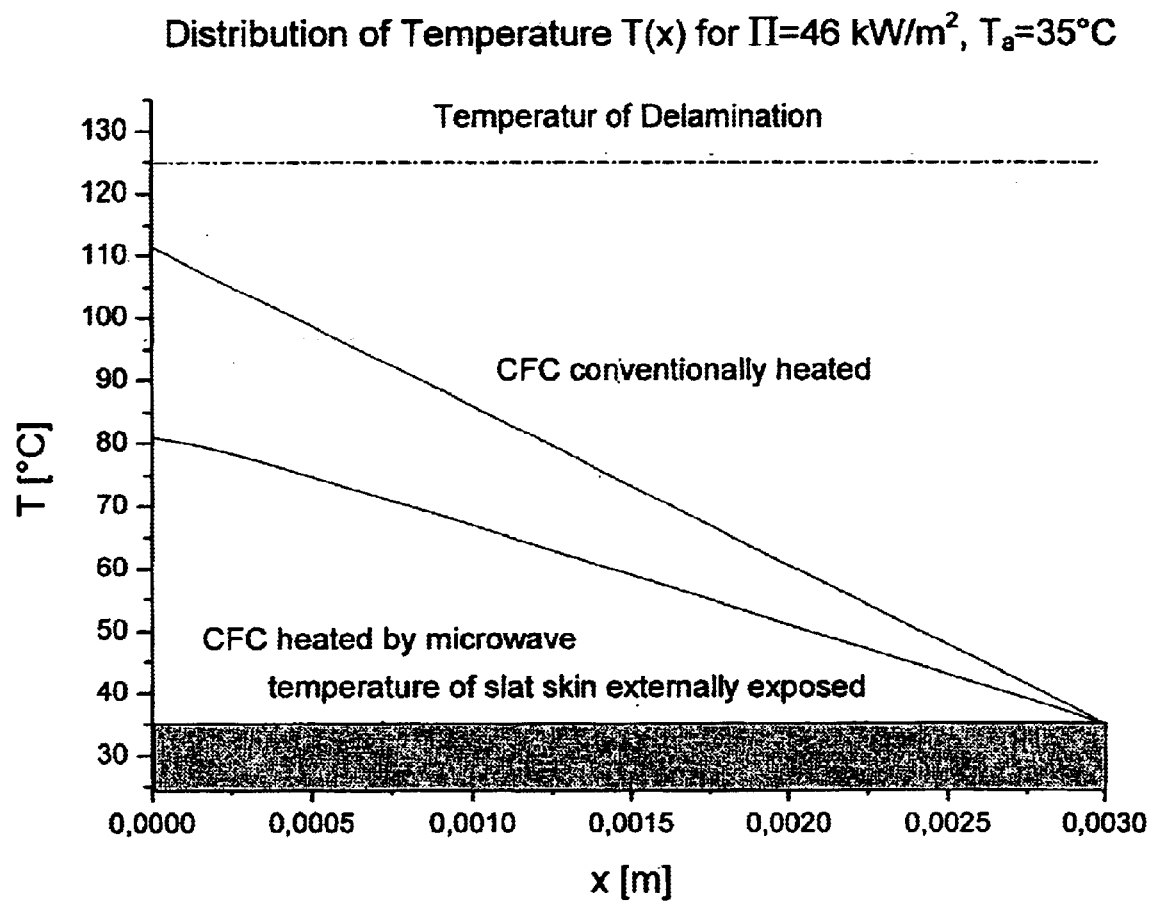
FIG. 5 shows the temperature distribution in the wall of a hollow structure.

FIG. 5 shows a mode of operation with the thermal effects thereof on the walls of the slat in the front area thereof. In the figure, for a particular slat geometry, conventional heating—heat input by blowing hot air at the interior wall—straight line in the figure marked "CFK conventionally heated" is compared with CFK heating by way of millimeter waves, marked "CFK millimeter wave heated". The wall of the hollow body slat structure is 3 mm thick at the front end of the slat. The wall consists essentially of CFK material and the thin outer metal skin of aluminum which is disposed directly on the CFK wall. In FIG. 5, the delamination temperature of 130° C. of the CFK material is indicated by a dash-dotted horizontal line which highlights the heat problems encountered with conventional heating in a comparison. During heating of the metal skin to 25 to 35° C., hot air of about 110° C. must be blown at the CFK interior wall of the slat in order to generate in the aluminum skin the same temperature as it can be generated by millimeter heating with a temperature at the surface of 80° C. With conventional heating, the temperature of the CFK material obtained by exposure to a flow of hot air is only 20° C. from the delamination temperature which is dangerously close. Since, furthermore with hot air heating, a homogeneous heating cannot be counted on, local delaminations may easily occur. With millimeter wave heating, the CFK material remains 50° C. below the dangerous delamination temperature for achieving the same metal skin temperature, that is, there is a substantially larger safety margin. Measurements have shown that no hot spots are generated in the CFK structural material.

Consequently, with the millimeter wave system, areas can be de-iced and can be kept free of ice while the lightweight compound construction materials are not subjected to temperatures which may cause a destruction of the structure, not even locally. With the millimeter wave heating, the CFK wall reaches a maximum temperature of slightly over 80° C. which does not result in thermal stresses of the CFK material at a millimeter wave frequency of $\geq 20$ GHz.

As shown in the diagram heating by millimeter waves results in a higher temperature in the wall adjacent the inner surface. The reason herefor is the volumetric heating effect of the millimeter wave on the CFK volume. It provides for an essentially higher heating efficiency as compared with conventional heating techniques.

The significant peak temperature reduction with the use of millimeter waves in comparison with conventional heating under otherwise equal operating and power requirements is achieved in that the millimeter wave penetrates the CFK material and generates heat within the first third of the CFK laminate so that there is no need for a heat-conduction-dependent transfer of the heat to the laminate. From there, that is from the location within the wall where the heat is generated, the heat flows to the outer skin by conduction. The volume or material heating furthermore permits high heating rates for bringing the outer skin of the slat to the respective melting temperature at the required area power density. This provides for high dynamics under all possible conditions.

What is claimed is:

1. A compact millimeter wave system for preventing icing and de-icing outer surfaces of shell structures exposed to meterological influences and including form-stable hollow structure of plastic or compound materials with dielectric properties, at least one millimeter wave source with a controllable power output and a hollow conductor flanged to said millimeter source and including an uncoupling system for the release of monochromatic millimeter waves with a frequency $\geq 20$ GHz, said shell structure including a front area which is subject to icing, consisting of a laminated structure including a dielectric compound material and a metallic skin disposed on the outside of said shell structure front area and being in electrical contact with other adjacent electrically conductive components so that a hollow shell space surrounded by metal is formed, an independently operable millimeter wave system disposed in each such hollow shell space, said millimeter wave system comprising a millimeter wave source with a power supply, an uncoupling structure connected to said millimeter wave source and extending in the interior of said shell structure along the front area thereof such that the millimeter waves uncoupled from said uncoupling structure reach the inner surface of said compound material in the form of a wavefront and penetrates into the compound material whereby the compound material is heated internally and the heat is conducted rapidly to the outer surface of the compound material from where the heat is removed so that the inner surface of the compound material remains substantially velow the delamination temperature of about 130° C. of the compound material while, at the interface between the compound material and the metal skin, a predetermined area energy density of up to 60 kW/m$^2$ may be maintained when the metal skin is covered by clear ice, whereby the metal skin can be maintained at a temperature of +10° C. to 70° C. depending on the meteorological conditions so as to de-ice the metal skin or prevent icing thereof when the millimeter wave system is in operation.

2. A millimeter wave system according to claim 1, wherein said hollow conductor flanged to said microwave source extends along said front area of said shell structure and said uncoupling openings are arranged along said front area and directed toward said front area such that in millimeter waves uncoupled from said hollow conductor through said uncoupling openings superimpose to form said wave front.

3. A millimeter wave system according to claim 2, wherein said millimeter wave source is adapted in its passage and blocking attenuation by way of circulators to the millimeter wave-coupling compound structure representing a consumer.

4. A millimeter wave system according to claim 3, wherein said monochromatic millimeter wave source is, dependent on the power output and frequency range desired, one of klystron, magnetron and extended interaction oscillator (EIO).

5. A millimeter wave system according to claim 4, wherein said hollow conductors and uncoupling structure have electrically conductive walls.

6. A millimeter wave system according to claim 4, wherein said hollow conductors and uncoupling structures consist of one of aluminum and CFK composite material surrounded by a net of electrically well conductive metallic material of a mesh size small enough to prevent the escape of the millimeter wave contained thereby.

7. A millimeter wave system according to claim 4, wherein such a system is disposed at the front areas of ships which are sprayed by water that may form ice under certain atmospheric conditions.

8. A millimeter wave system according to claim 4, wherein such a system is disposed in one of the aerodynamically important structures of an air transporter which structures need to be kept free of ice.

9. A millimeter wave system according to claim 8, wherein said air transporter is one of an airplane and a helicopter.

10. A millimeter wave system according to claim 9, wherein said system is installed in the slats at the front of airplane wings.

11. A millimeter wave system according to claim 8, wherein said system is disposed in the front areas of the structures of said air transporter which are important for providing lift.

12. A millimeter wave system according to claim 11, wherein said system is disposed in the front areas of the elevators and the side rudders of airplanes.

13. A millimeter wave system according to claim 11, wherein said system is disposed in the annular front section around the air inlets of jet engine housings.

14. A millimeter wave system according to claim 4, wherein said system is installed in rotor blades of wind power generators.

* * * * *